(12) United States Patent
Schaumann et al.

(10) Patent No.: US 7,356,438 B2
(45) Date of Patent: Apr. 8, 2008

(54) METHOD AND DEVICE FOR TEMPERATURE MONITORING ALONG A MEASURING LINE

(75) Inventors: Oliver Schaumann, Hamburg (DE); Wilhelm Groenning, Hamburg (DE); Martin Schuldt, Bad Zwischenahn (DE)

(73) Assignee: Airbus Deutschland GmbH (DE)

( * ) Notice: Subject to any disclaimer, the term of this patent is extended or adjusted under 35 U.S.C. 154(b) by 92 days.

(21) Appl. No.: 11/019,593

(22) Filed: Dec. 21, 2004

(65) Prior Publication Data

US 2005/0159915 A1 Jul. 21, 2005

(30) Foreign Application Priority Data

Dec. 22, 2003 (DE) ................ 103 60 485

(51) Int. Cl.
*G01K 7/00* (2006.01)
(52) U.S. Cl. .................... 702/130
(58) Field of Classification Search ........... 702/99, 702/130, 75–77, 150, 155, 158, 161, 182–185, 702/85, 90, 91, 104, 118, 132, 168, 188; 374/119; 244/1 R, 171.8; 236/49.3, 78 B, 236/91 F
See application file for complete search history.

(56) References Cited

U.S. PATENT DOCUMENTS

| 3,493,949 A | 2/1970 | Servos et al. ........ 340/524 |
|---|---|---|
| 4,587,743 A * | 5/1986 | Nambu et al. ........ 34/486 |
| 5,286,109 A * | 2/1994 | Hanscombe et al. ........ 374/119 |
| 5,467,942 A * | 11/1995 | Abbas et al. ........ 244/1 R |
| 5,677,695 A * | 10/1997 | Suzuki et al. ........ 342/109 |
| 6,366,236 B1 * | 4/2002 | Farmer et al. ........ 342/195 |
| 2002/0041232 A1 * | 4/2002 | Harman ........ 340/541 |
| 2002/0125414 A1 | 12/2002 | Dammann ........ 250/227.14 |
| 2004/0140421 A1 | 7/2004 | Dammann ........ 250/227.14 |
| 2004/0262409 A1 * | 12/2004 | Crippen et al. ........ 236/49.3 |

FOREIGN PATENT DOCUMENTS

| DE | 195 25 626 | 4/1996 |
|---|---|---|
| DE | 198 09 763 A1 | 12/1999 |
| EP | 0 692 705 A1 | 1/1996 |
| EP | 0 940 789 A2 | 9/1999 |
| EP | 1 239 432 A2 | 9/2002 |

\* cited by examiner

*Primary Examiner*—Edward Raymond
*Assistant Examiner*—Mohamed Charioui
(74) *Attorney, Agent, or Firm*—Ostrolenk, Faber, Gerb & Soffen, LLP

(57) ABSTRACT

The present invention relates to a registering device for registering a location along a measuring line, at which location a temperature change takes place. In an advantageous way, according to one exemplary embodiment of the present invention, by means of the FMCW method a location on the measuring line is determined, at which location a temperature increase exceeds a predefined threshold value. The location is determined on the basis of a signal which is registered by the measuring line in response to a fed-in frequency modulated signal from evaluation electronics. Advantageously, in this way a simple and lightweight overheating warning system is provided, for example for hot-air supply pipes in aircraft.

12 Claims, 2 Drawing Sheets

METHOD AND DEVICE FOR TEMPERATURE MONITORING ALONG A MEASURING LINE

TECHNOLOGICAL BACKGROUND

Modern transport aircraft generally use hot bleed air from the engines, among other things for airconditioning the cabin. To this effect, hot-air supply pipes lead from the engines to the cabin. These hot-air supply pipes comprise warning wires for the detection of any leakages. Usually this sensor line is a coaxial cable with a centre conductor and a sheath containing thermally sensitive eutectic salt as an insulation material. If at any point along the length of the measuring wire strong heating occurs as a result of a leakage, the resistance of the eutectic salt within the heated section drops and ensures that current starts to flow between the outer sheath and the centre conductor. This short circuit is then measured by way of a control unit. Nowadays a bridge-type measuring method is commonly used for precisely locating the leakage and for improving the servicability of the system.

However, such a bridge-type measuring method, i.e. locating a leakage by way of a measuring bridge, requires an expensive design of the sensor line. Since the length of the sensor lines, for example in a large passenger aircraft, can be substantial (up to 400 m), this leads to a considerable system weight and to considerable expenditure.

Moreover, such a twin-conductor cable with a centre conductor and sheath comprising thermally sensitive eutectic salt can only be used for a temperature threshold which corresponds to the material properties of the eutectic salt. Changes in this temperature threshold value can only be made within very narrow limits and then require costly development, e.g. to develop a corresponding new salt. Accordingly, with this known solution it is not possible to set the temperature threshold value without incurring substantial expenditure.

SUMMARY OF THE INVENTION

According to one exemplary embodiment of the present invention a detecting device is provided, which detecting device comprises a signal generator, evaluation circuit and a measuring line. The signal generator feeds a transmit signal into the measuring line. In response to the transmit signal, the evaluation circuit receives a response signal of the measuring line and determines the location where the temperature change occurs on the basis of the response signal.

In other words, the transmit signal is fed into the measuring line, and on the basis of the response signal of the measuring line to the transmit signal, the evaluation circuit determines the location of the temperature change.

This may allow a simple registering of a location along a measuring line, at which location a temperature change takes place.

Advantageously, this makes possible a simple, fast and precise determination of a location of a temperature change. For example, when used in an aircraft, such precision can be achieved that the location of a leakage can be narrowed down to a service flap of said aircraft so that the maintenance expenditure in the case of a leakage is reduced.

Furthermore, on the basis of the present invention, less complex and thus more economical types of cable can be used, and there is no need to use double-conductor cables with eutectic salts. This increases the cost effectiveness of the detecting device.

According to another exemplary embodiment of the present invention, the FMCW (frequency modulated continuous wave) principle is applied. With this principle, a frequency modulated swept (or wobbled) microwave signal is fed into the measuring line by the frequency generator, wherein said measuring line can for example be a single-conductor, double-conductor or multi-conductor cable. The response of the measuring line to the fed-in signal, i.e. the reflected signal, is mixed or multiplied with the transmit signal. As a result of this, a differential frequency is generated which contains distance information. The frequency of the transmit signal undergoes a linear change over time. In this way, distance information on the location of the fault (of the leakage or of the location where a temperature change takes place) is obtained in the frequency range. This information can then be evaluated simply, for example by way of Fast-Fourier transformation.

Advantageously, the detection of ohmic, capacitive or inductive changes in the measuring line may be detected as a result of excessive heat build-up, which in turn makes it possible to use various types of cables so that overheating-detection circuits can be implemented easily and economically. Furthermore, an alarm threshold value and the response characteristics of the detecting device can simply be set within a wide range by a corresponding selection of the cable type and by setting the evaluation circuit. Furthermore, by adaptive anti-distortion and processing in the image range or frequency range, very good measuring accuracy can be achieved which results in a reduction in the maintenance effort during troubleshooting. According to a preferred embodiment of the present invention, essentially all the components of the detecting device (except for the warning wires, i.e. the measuring lines) can be implemented in digital form. This results in a simple and economical detecting device.

Further advantageous exemplary embodiments of the present invention are set out in the subordinate claims.

DETAILED DESCRIPTION OF EXEMPLARY EMBODIMENT

Below, exemplary embodiments of the present invention are described with reference to the accompanying figures.

Below, with reference to FIGS. 1 to 3, an exemplary embodiment of the detecting device for detecting a location along a measuring line, at which location a temperature change takes place, is described with reference to a temperature monitoring device for hot-air supply pipes of an aircraft. However, it must be pointed out that the present invention is not limited to application in an aircraft. Nor is the present invention limited to detecting a temperature increase, instead it can also be applied to detecting a local temperature decrease. Furthermore, the present invention can for example also be used in fire warning systems, both in aircraft-related applications and in applications not related to aircraft.

Figure 1:
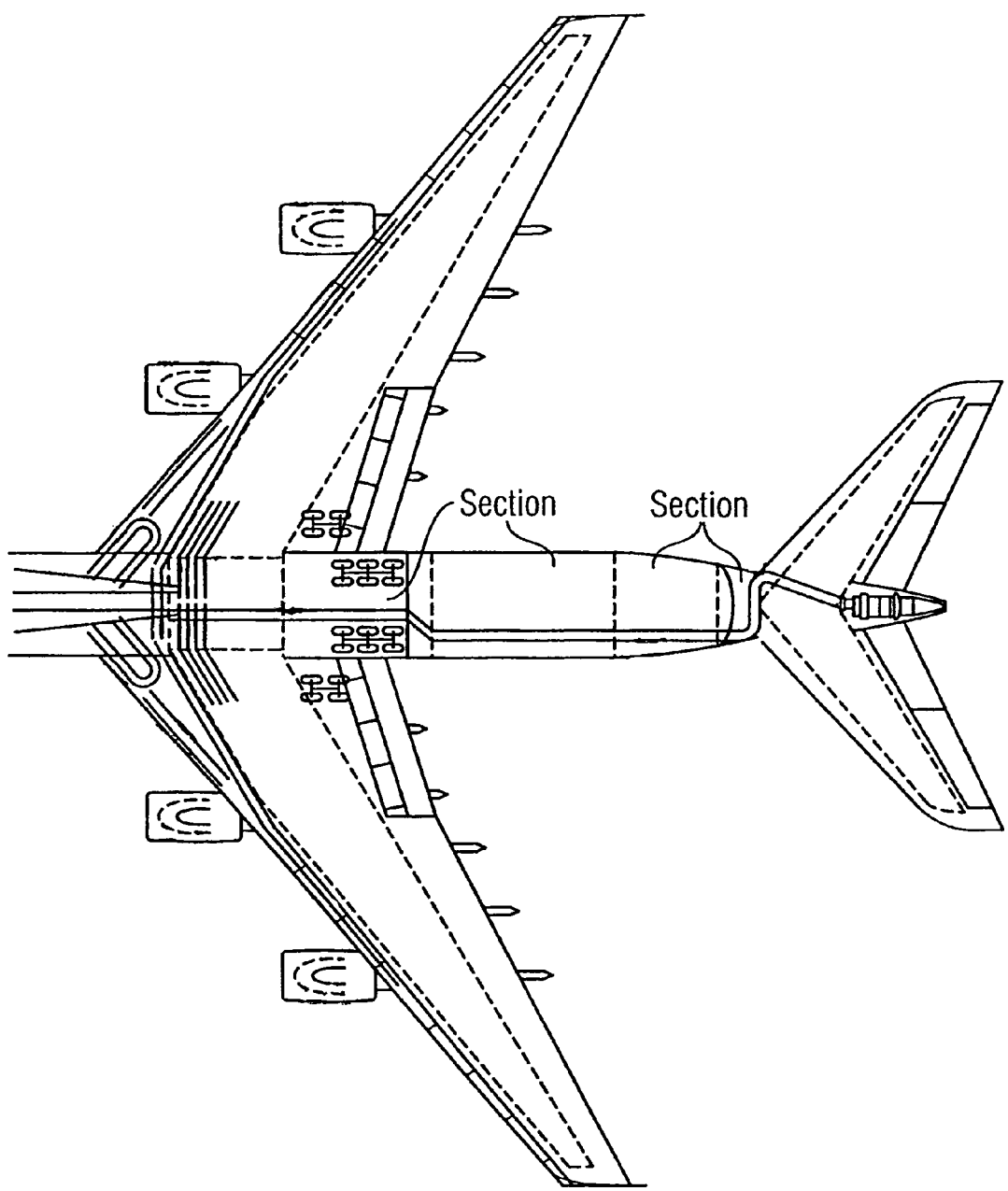
FIG. 1 shows an exemplary embodiment of the arrangement of measuring lines of the detecting device according to the present invention, as they can for example be arranged in an aircraft of the type Airbus A380.

FIG. 1 shows an arrangement of measuring lines or warning wires along hot-air supply pipes with reference to an aircraft of the type Airbus 380. As is shown in FIG. 1, the length of the measuring lines is very considerable so that for example any reduction in the diameter of said measuring lines or any reduction in the weight of the structure of said measuring lines can result in a significant reduction in the weight of the aircraft and a corresponding reduction in fuel consumption. FIG. 1 also shows that the measuring wires are even arranged along the hot-air bleed pipes in the engine region. The designations of the measuring lines used in FIG. 1 are arbitrary and only serve as an example of a possible arrangement of associated measuring lines.

Figure 2:
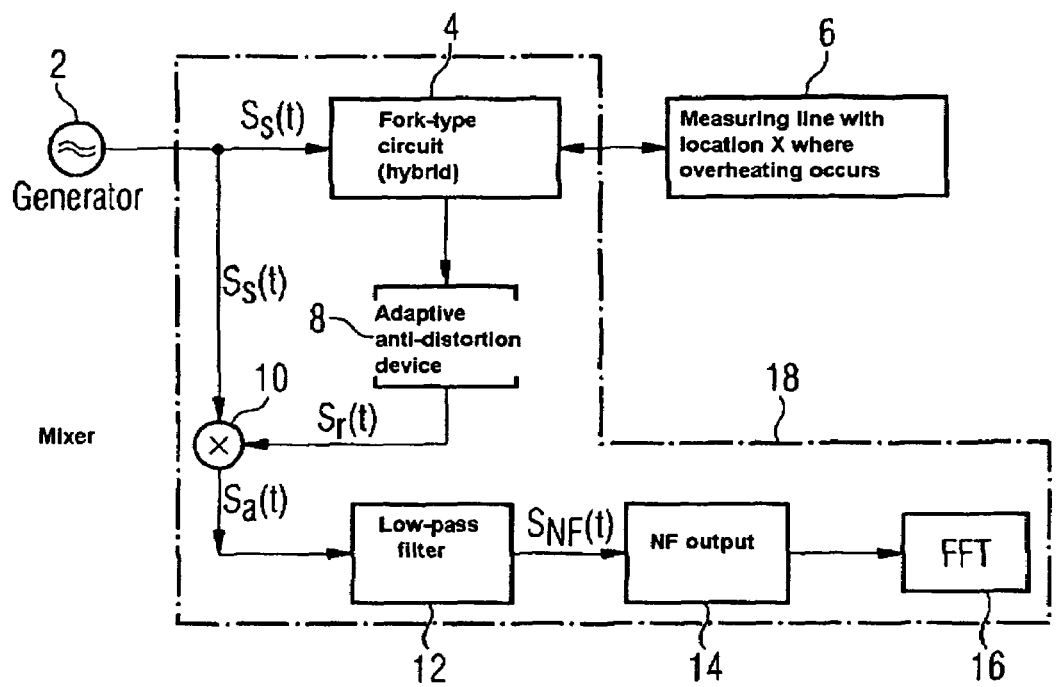
FIG. 2 shows a simplified block diagram of an exemplary embodiment of the detecting device according to the present invention.

FIG. 2 is a simplified block diagram of an exemplary embodiment of a detecting device according to the present invention. Reference number 2 designates a signal generator which feeds the signal $S_s(t)$ to evaluation circuit 18 which feeds the signal $S_s(t)$ into the measuring line 6. Preferably, the signal $S_s(t)$ is fed from the generator 2 by way of a fork-type circuit 4, which can be a hybrid circuit, to the measuring line 6. The reply of the measuring line 6 in response to the fed-in signal $S_s(t)$ is fed back from the measuring line 6 to the evaluation circuit 18, namely to the fork-type circuit 4, where the response signal from the measuring line, i.e. the transmit signal $S_s(t)$ reflected by the measuring line, is split off and, by way of an adaptive anti-distortion means 8, is fed as a signal $S_r(t)$ into a mixer (multiplier) 10. The mixer or multiplier 10 multiplies the signal $S_s(t)$ with the signal $S_r(t)$ in order to obtain a signal $S_a(t)$ which, following low-pass filtering in a low pass 12, is transmitted as a signal $S_{nf}(t)$ to an NF output 14 from which it is, for example, transmitted to a Fast-Fourier transformer 16. In the above example, NF designates low frequency.

Below, the function of the detecting device shown in FIG. 2 is explained in more detail.

As has been mentioned before, according to the present invention the FMCW (frequency modulated continuous wave) principle is used in an advantageous manner for lines as fire warning systems and overheating warning systems. According to the present exemplary embodiment, excessive heating at any point along the entire length of the warning wire circuit, i.e. the measuring line, is to be determined, e.g. in the wing of an aircraft.

Figure 3:
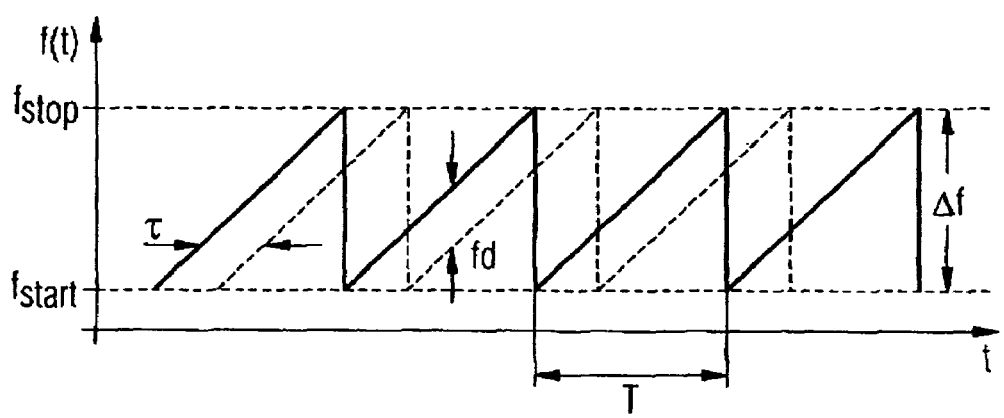
FIG. 3 shows a time lapse diagram which depicts a frequency curve of the transmit signal and a frequency curve of the receive signal in the detecting device according to the present invention.

FIG. 3 shows a time lapse diagram which shows a frequency curve of the sensor signal $S_s(t)$ and of the receive signal, namely the signal which is reflected by the measuring line 6 in response to the transmit signal $S_s(t)$. The frequency curve of the transmit signal $S_s(t)$ is shown by a solid line, while the frequency curve of the receive signal, i.e. of the response signal of the measuring line 6, is shown by a dot-dash line. As shown in FIG. 3, the signal generator 2 changes the frequency of the transmit signal $S_s(t)$ preferably in the microwave frequency range between the frequencies $f_{stop}$ and $f_{start}$. A frequency difference between $f_{stop}$ and $f_{start}$ is referred to as $\Delta f$ or the frequency deviation.

Below, the function of the detecting device shown in FIG. 2 is explained when the signal generator 2 feeds the transmit signal $S_s(t)$, shown in FIG. 3, into the measuring line 6 by way of the evaluation circuit 18, and said evaluation circuit 18 analyses the signal reflected by the measuring line 6, wherein such analysis takes place according to the FMCW method.

Provided a period T of the transmit signal $S_s(t)$ considerably exceeds a run time τ of the receive signal, multiplication (using the mixer 10) of the transmitted signal with the reflected signal results in a differential frequency $f_d$ which contains distance information. According to one exemplary embodiment of the present invention, the frequency F(t) of the signal generator 2, which is for example a sweep or wobble source, is changed in a linear way over time.

Assuming the sweep, shown in FIG. 3, between the frequencies $f_{start}$ and $f_{stop}$ over time T, the following applies to a sweep period $0 < t \leq T$:

$$\Omega(t) = 2 \cdot \pi \cdot f_{start} + 2 \cdot \pi \cdot \Delta f \cdot \frac{t}{T} = \Omega_{start} + \Delta \Omega \cdot \frac{t}{T}$$

where: T=the period duration [s], F=frequency [Hz], and $\Delta f$=frequency deviation [Hz].

Frequency deviation is calculated as follows:

$B = \Delta f = f_{stop} - f_{start}$

A phase curve $\phi(t)$ of the transmitted signal can be determined by an integration of the frequency $\Omega(t) = 2 \cdot \pi \cdot f(t)$ which changes over time:

$$\varphi(t) = \int \left( \Delta \Omega \cdot \frac{t}{T} + \Omega_{start} \right) dt = \left( \frac{\Delta \Omega}{2 \cdot T} \cdot t + \Omega_{start} \right) \cdot t + \varphi_0.$$

This results in the following transmit signal:

$$S_s(t) = \hat{u} \cdot \sin\left( \left( \frac{\Delta \Omega}{2 \cdot T} \cdot t + \Omega_{start} \right) \cdot t + \varphi_0 \right).$$

Accordingly, as shown in FIG. 2, part of the transmit signal $S_s(t)$ is applied to a local oscillator input of a receive mixer. The signal $S_r(t)$, which is reflected by the measuring line 6, which signal has been filtered out by way of a hybrid fork-type circuit and has been corrected by means of an anti-distortion means 8, then reaches a signal output of the mixer 10.

In an idealised fault location, the receive signal $S_r(t)$ is the transmit signal which has been delayed by the run time τ and which has been attenuated by the factor A (see FIG. 3):

$$S_r(t) = \hat{u} \cdot A \cdot \sin\left( \left( \frac{\Delta \Omega}{2 \cdot T} \cdot (t - \tau) + \Omega_{start} \right) \cdot (t - \tau) + \varphi_0 \right).$$

Superposition of the local oscillator and the signal during the period T generates a differential frequency $f_d$ in the mixer, which differential frequency $f_d$ depends on the frequency deviation $B = \Delta f = f_{stop} - f_{start}$, of the repeat frequency F and the runtime τ of the signal received.

The output signal from the mixer or multiplier 10 $S_a(t)$ can now be described as follows:

$$S_a(t) = \frac{\hat{u}^2}{2} \cdot A \cdot \left[ \cos\left( \frac{\Delta \Omega \cdot \tau}{T} \cdot t - \frac{\Delta \Omega \cdot \tau^2}{2 \cdot T} + \Omega_{start} \cdot \tau \right) - \cos\left( \left( \frac{\Delta \Omega}{T} \cdot (t - \tau) + 2 \cdot \Omega_{start} \right) \cdot t + \frac{\Delta \Omega \cdot \tau^2}{2 \cdot T} - \Omega_{start} \cdot \tau + 2 \cdot \varphi_0 \right) \right]$$

This output signal now consists of a differential frequency and a sum frequency. However, only the differential frequency is of interest because it contains the distance information from the beginning of the measuring line 6 to the location of overheating. At this stage, conversion efficiency k of the mixer 10 has not yet been taken into account. After low-pass filtering using the low-pass filter 12, the low-frequency signal $S_{NF}(t)$ and thus the differential frequency is obtained:

$$S_{NF}(t) = \frac{\hat{u}^2}{2} \cdot A \cdot \cos\left(\frac{\Delta\Omega \cdot \tau}{T} \cdot t - \frac{\Delta\Omega \tau^2}{2 \cdot T} \Omega_{start} \cdot \tau\right).$$

The delay time $\tau$ of the signal results from the distance $1_x$ and the transmission speed $V_p$:

$$\tau = \frac{2 \cdot 1_x}{V_P}.$$

As shown in FIG. 3, the differential frequency $f_d$ between the local oscillator frequency and the signal frequency (between $S_s(t)$ and $S_r(t)$) is constant and can be described by the following relationship:

$$f_d \frac{\Delta f}{T} \cdot \tau = \frac{\Delta f}{T} \cdot \frac{2 \cdot 1_X}{V_P}.$$

The distance information relating to the fault location (leakage) is obtained in the frequency range. Consequently, said distance information can be determined in a simple manner, for example by way of a Fast-Fourier transformation (FFF). However, the signal $S_{NF}(t)$ can also be conveyed to another evaluation device by means of the NF output 14, for example to an on-board computer of an aircraft. In this case, the Fast-Fourier transformation can for example simply be carried out on the software side. If excessive heat build-up is experienced at a fault location, a spectral line is obtained in the spectrum at the differential frequency $f_d$. Without low-pass filtering, there would still be an infinite number of spectral lines from the frequency $f_{summe}$ (t=0)=$-f_d+2 \cdot f_{start}$ to half the scanning frequency fa; wherein: $f_{stop}$=fa/2. This, at the same time, also corresponds to the Nyquist frequency. The sum frequency continuously increases over time, as can be described by the following expression:

$$f_{summe} = \frac{\Delta f}{T} \cdot (t - \tau) + 2 \cdot f_{start}.$$

In contrast to the above, the differential frequency $f_d$ remains constant. The signal energy of the two frequencies is the same. For this reason, the spectrum (without low-pass filtering) shows a large line ($f_d$) and an infinite number of small lines (sum frequencies).

In summary, the present invention thus relates to the use of the FMCW method for measuring lines as fire warning systems and/or overheating warning systems. In this arrangement, for example excessive heat build-up at any point along the measuring line is determined. According to a further advantageous exemplary embodiment of the present invention, for example a gradient, i.e. the speed of a rise in temperature and/or the ambient temperature within a tolerance range, are/is calculated. According to an exemplary embodiment, this information is used to qualitatively assess a hot-air leakage and/or to define an advance warning.

Localisation—in the microwave spectrum by means of the FMCW system—of a location where overheating occurs is not only associated with easy implementation and low cost, but also with the advantage that such a solution can be implemented very economically, for example by means of digitalisation.

Furthermore, a digital design of the detecting device according to the present invention makes possible easy setting of a temperature threshold, wherein for example an alarm is output if said threshold is exceeded, not reached or passed through. Furthermore, very high measuring accuracy is achieved.

In other words, the above-mentioned device and the corresponding method make possible the detection of ohmic, capacitive or inductive changes in the measuring line as a result of excessive heat build-up. In this way, advantageously, the use of various types of cables becomes possible so that overheating detection, for example for an aircraft, can be implemented easily and economically. The alarm threshold value and the response characteristics can be set within a wide range by a corresponding selection of the type of measuring cable and by setting the parameters of the components of the evaluation circuit 18. By way of adaptive anti-distortion and processing in the image range or frequency range, very good measuring accuracy can be achieved which results in a reduction in the maintenance effort during troubleshooting, for example in the case of a leakage in an aircraft.

The invention claimed is:

1. A detecting device for detecting a location of a temperature change occurring along a measuring line disposed within a structure, the device comprising:
    a measuring line comprising a cable which is operable to support the propagation of frequency-varying signals therealong;
    a signal generator feeding a frequency-modulated feed signal into the measuring line; and
    an evaluation circuit receiving a response signal of the measuring line in response to inputting the feed signal into the measuring line, wherein the frequency of said response signal is modulated by a change in the ohmic, capacitive, or inductive properties of the measuring line at a location where said temperature change occurs,
    the evaluation circuit arranged to determine the location where a temperature change occurs, on the basis of the response signal.

2. The detecting device according to claim 1,
    wherein the feed signal is a microwave signal; and
    the signal generator is designed to cause a linear change in a frequency of the feed signal between an upper limiting frequency and a lower limiting frequency.

3. The detecting device according to claim 2, further comprising a registering device operated on the basis of the frequency modulated continuous wave principle.

4. The detecting device according to claim 1,
    wherein the evaluation circuit is connected to the signal generator;
    the evaluation circuit comprises a mixer for mixing the feed signal with the response signal to form a differential frequency signal,
    the differential frequency signal contains distance information; and
    the evaluation circuit is arranged to determine the location where the temperature change occurs, on the basis of the response signal.

5. The detecting device according to claim 4,
wherein the evaluation circuit essentially comprises digital components including a low-pass filter, and is adapted to carry out a Fast-Fourier transformation of the differential frequency signal,
the distance information is in the frequency range of the differential frequency signal; and
the response signal is the feed signal reflected by the measuring line.

6. The detecting device according to claim 1, wherein the evaluation circuit is adapted to determine a gradient of the temperature change.

7. The detecting device according to claim 1,
wherein the evaluation circuit outputs an alarm if a temperature threshold is exceeded; and
wherein the evaluation circuit is arranged to determine a gradient of the temperature change over time.

8. The detecting device according to claim 1, wherein the detecting device is one of an overheating warning system or a fire warning system for hot-air supply pipes in an aircraft.

9. A method for detecting a location of a temperature change occurring along a measuring line disposed within a structure, comprising the following steps:
feeding a frequency modulated feed signal into a measuring line disposed within a structure, said measuring line comprising a cable which is operable to support the propagation of frequency varying signals therealong;
receiving a response signal output from the measuring line,
wherein the frequency of said response signal is modulated by a change in the ohmic, capacitive, or inductive properties of the measuring line at a location where said temperature change occurs; and
determining the location where the temperature change occurs on the basis of the response signal.

10. The method according to claim 9,
wherein the feed signal is a microwave signal; and
a frequency of the feed signal is linearly changed between an upper limiting frequency and a lower limiting frequency.

11. The method according to claim 10, wherein the method is implemented on the frequency modulated continuous wave principle.

12. The method according to claim 9, further comprising the following steps:
mixing the feed signals with the response signal to form a differential frequency signal;
determining the location where the temperature change occurs, on the basis of the differential frequency signal, the differential frequency signal containing distance information;
low-pass filtering of the mixed signal, which contains sum and differential frequencies, to isolate the differential frequency;
determining a temperature change gradient; and
setting a temperature threshold, wherein an alarm is output if said temperature threshold is exceeded.

* * * * *